(12) United States Patent
Gisolfi et al.

(10) Patent No.: US 8,082,291 B2
(45) Date of Patent: Dec. 20, 2011

(54) IDENTIFYING RELEVANT DATA FROM UNSTRUCTURED FEEDS

(75) Inventors: Daniel A. Gisolfi, Hopewell, NY (US); David L. Kaminsky, Chapel Hill, NC (US); Rodney A. Smith, Smyrna, GA (US); Thomas O. Rowe, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 12/430,159

(22) Filed: Apr. 27, 2009

(65) Prior Publication Data

US 2010/0274832 A1 Oct. 28, 2010

(51) Int. Cl.
*G06F 15/16* (2006.01)

(52) U.S. Cl. .................. 709/201; 709/202; 709/205

(58) Field of Classification Search .................. 709/201, 709/202, 205
See application file for complete search history.

(56) References Cited

U.S. PATENT DOCUMENTS

| | | | |
|---|---|---|---|
| 2009/0171754 A1* | 7/2009 | Kane et al. | 705/10 |
| 2009/0171755 A1* | 7/2009 | Kane et al. | 705/10 |
| 2009/0171968 A1* | 7/2009 | Kane et al. | 707/10 |
| 2009/0287657 A1* | 11/2009 | Bennett | 707/3 |

* cited by examiner

*Primary Examiner* — Larry Donaghue
*Assistant Examiner* — Nicholas Taylor
(74) *Attorney, Agent, or Firm* — Jordan IP Law, PC

(57) ABSTRACT

A system and method of providing data to a mashup application may involve receiving a request from a mashup application and supplying first data to the mashup application in response to the request. Mashup information can be received from the mashup application, wherein the mashup information indicates an inclusion of the first data with second data in the execution of the mashup application. The mashup information may be stored and analyzed to identify relationships between previously unrelated data.

10 Claims, 3 Drawing Sheets

| Data ID | Mashup ID | Mashup Freq. | Related Data | | Related Data | | ... |
|---------|-----------|--------------|------|----------|------|----------|-----|
| | | | ID | Interact. | ID | Interact. | |
| IF0001 | P07920 | 3 | EM0203 | 10 | EA0087 | 0 | |
| IF0002 | | | | | | | |
| ⋮ | | ⋮ | | | | | |
| IT0001 | | | | | | | |
| IT0002 | | | | | | | |
| ⋮ | | | | | | | |
| IA0001 | | | | | | | |
| IA0002 | | | EM0203 | | | | |
| ⋮ | | | | | | | |
| IV0001 | | | | | | | |
| IV0002 | | | | | | | |
| ⋮ | | | | | | | |

30

32 — Receive a request from a mashup application

34 — Supply first data to mashup application

36 — Receive mashup information from mashup application, where mashup information indicates an inclusion of first data with second data in the execution of the mashup applicatoin 38 — Store mashup information

FIG. 4

IDENTIFYING RELEVANT DATA FROM UNSTRUCTURED FEEDS

BACKGROUND

1. Technical Field

Embodiments of the present invention generally relate to mashups. More particularly, embodiments of the invention relate to the identification of relationships among unstructured data used within mashups.

2. Discussion

In web development, a "mashup" can be a Web application that combines feeds from one or more sources into a single integrated application. Typically, when a source supplies a feed to a mashup application, the mashup application does not return any information about the resulting mashup. Similarly, tools used to create mashup applications do not return information about the mashup applications. Accordingly, the lack of knowledge from the perspective of the entity controlling the feed source about the relationship of its feeds to the feeds of other sources may result in missed service opportunities.

BRIEF SUMMARY

Embodiments of the present invention provide for a computer-implemented method that involves receiving a request transmission from a mashup application and supplying first data to the mashup application in response to the request transmission. A Mashup information transmission may be received from the mashup application, where the mashup information transmission is separate from the request transmission and can indicate an inclusion of the first data with second data in an execution of the mashup application as a single, integrated application within a browser. Receiving the mashup information transmission may include receiving mashup usage frequency information and receiving an indication of a level of interaction between the first data and the second data in the mashup application. In addition, the method can provide for weighting the mashup information based on at least one of the level of interaction and the mashup usage frequency information. The method may also involve storing the mashup information, wherein the mashup usage frequency tracks how many times the mashup application has been executed, and the level of interaction between the first data and the second data indicates a degree to which the first data leads to activity with regard to the second data.

Other embodiments of the present invention may also provide for a computer program product having a computer readable medium and computer usable code stored on the computer readable medium, where, if executed by a processor, the computer usable code can cause a computer to obtain first descriptor information corresponding to first data from a first data source. The computer usable code may also obtain second descriptor information corresponding to second data from a second data source, and include the first and second descriptor information in a mashup application. In addition, the computer usable code can transmit mashup information to the first data source, wherein the mashup information indicates an inclusion of the first descriptor information with the second descriptor information in a mashup application. The mashup information could also include an indication of a level of interaction between the first data and the second data in the mashup. The computer usable code may further be configured to store the mashup information as an entry to a tracking database and identify a relationship between the first data and third data based on the entry.

Embodiments may also include a computer program product having a computer readable medium and computer usable code stored on the computer readable medium, where, if executed by a processor, the computer usable code causes a computer to receive a request transmission from a mashup application. The computer usable code can also cause a computer to supply first data to the mashup application in response to the request transmission, and receive a mashup information transmission from the mashup application. The mashup information transmission may be separate from the request transmission and indicate an inclusion of the first data with second data in an execution of the mashup application as a single, integrated application within a browser, wherein the mashup information transmission includes mashup usage frequency information and an indication of a level of interaction between the first data and the second data in the mashup application. The mashup information may be weighted based on at least one of the level of interaction and the mashup usage frequency information, and the mashup information may be stored. In one example, the mashup usage frequency tracks how many times the mashup application has been executed, and the level of interaction between the first data and the second data indicates a degree to which the first data leads to activity with regard to the second data.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

FIG. 3 is a diagram of an example of a mashup information tracking database according to an embodiment of the present invention;

FIG. 4 is a flowchart of an example of a method of providing data to a mashup application according to an embodiment of the present invention.

DETAILED DESCRIPTION

Figure 1:
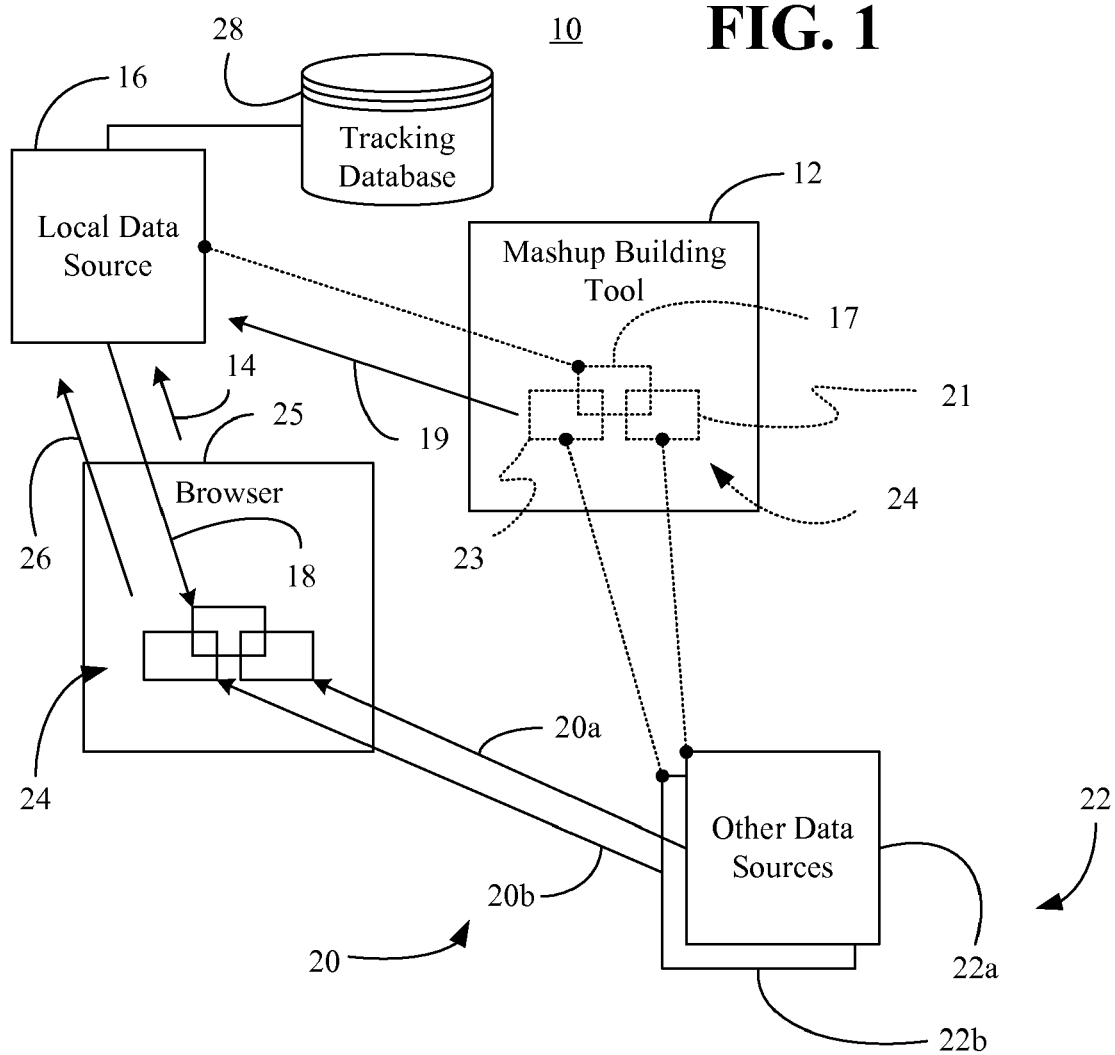
FIG. 1 is a block diagram of an example of a mashup creation and utilization scheme according to an embodiment of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be punch-card, paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring now to FIG. 1, an example of a mashup creation and utilization scheme 10 is shown. In the illustrated example, a mashup building tool 12 generally enables the creation of a mashup application 24 that will include data from a local data source 16 and data from other data sources 22 (22a-22b). The data from the sources 16, 22, might include feeds, blogs or Wiki text, audio, video, multimedia content, or any other type of data that may be incorporated into a mashup application. In particular, the mashup building tool 12 may have a palette of available data (e.g., weather and flight schedules) that are available for inclusion in the mashup application 24, along with the specifics of how the available data is to be combined to form the mashup application 24. An example of a mashup application could be the combination of weather data from a meteorological service with golf tee time data from a country club database, thereby creating a new and distinct Web service that was not originally provided by either source.

As available data sources are selected for inclusion in the mashup application 24, the mashup building tool 12 may add the appropriate descriptor information (e.g., feed metadata) to the mashup application 24. For example, the mashup building tool 12 could obtain descriptor information 17, 21 and 23, which corresponds to or describes the data from the local data source 16, and the other data sources 22a, 22b, respectively, and include the descriptor information 17, 21, 23, in the mashup application 24. In addition, a unique aspect of the illustrated embodiment is that the mashup building tool 12 may transmit mashup information 19 to the local data source 16, wherein the mashup information 19 indicates that the first descriptor information 17 has been included with the other descriptor information 21, 23 in the mashup application 24. Accordingly, the mashup information 19 may enable the local data source 16 to identify relationships between its own data and the data of other suppliers, to improve the experiences of its customers, and to identify new business opportunities.

The local data source 16 could reside on a single platform or be distributed across multiple platforms. The mashup building tool 12 may be remote from the local data source 16 and part of a server or other computing platform. Thus, in one example, the mashup building tool 12 communicates with the local data source 16 over a network (not shown) having any suitable combination of servers, access points, routers, base stations, mobile switching centers, public switching telephone network (PSTN) components, etc., to facilitate communication between the mashup building tool 12 and the local data source 16.

At run-time, a browser 25 such as Firefox from Mozilla or Internet Explorer from Microsoft, executing the mashup application 24 can request the data from the sources according to the descriptor information provided in the mashup application 24. In particular, the illustrated browser 25 submits a request 14 to the local data source 16. The illustrated local data source 16 supplies the requested data 18 to the browser 25, which also collects other data 20 (20a-20b) from the other data sources 22 during execution of the mashup application 24. The illustrated browser 25 also transmits mashup information 26 to the local data source 16 and to the other data sources 22. The mashup information 26 can indicate the inclusion of the requested data 18 with the other data 20 collected during the execution of the mashup application 24, the level of interaction between the requested data 18 and the other data 20, the usage frequency of the mashup application 24, and so on. The illustrated local data source 16 stores the mashup information 26 as one or more entries to a tracking database 28. Alternatively, the mashup information 26 may be transmitted directly to the tracking database 28, indirectly to the tracking database 28 via some other communication link, or to another destination. Indeed, the browser 25 and/or mashup building tool 12 might send the mashup information 19, 26 to a third party not directly associated with the local data source 16.

In one example, the browser 25 communicates with the local data source 16 over a network (not shown) having any suitable combination of servers, access points, routers, base stations, mobile switching centers, public switching telephone network (PSTN) components, etc., to facilitate communication between the browser 25 and the local data source 16. The user equipment (not shown) running the browser 25 and mashup application 25 could be a personal computer (PC), laptop, personal digital assistant (PDA), wireless smart phone, and so on. The connection of the user equipment to the network may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The data source 16, the browser 25, and/or the mashup building tool 12 could alternatively reside on the same platform.

The collected data 18, 20 may be considered unstructured in the sense that its inter-relevance may not have been known, acknowledged or fully documented by the entity associated with the local data source 16 prior to the data 18, 20 being collectively incorporated into the mashup application 24. The mashup information 19, 26 may therefore enable semantic inferences to be drawn for this unstructured data by monitoring how it is mashed with third party content. Put another way, the mashup information 19, 26 may enable the supplier of the local data 18 to identify relationships between its own data and the data of other suppliers, to improve the experiences of its customers, and to identify new business opportunities.

Figure 2:
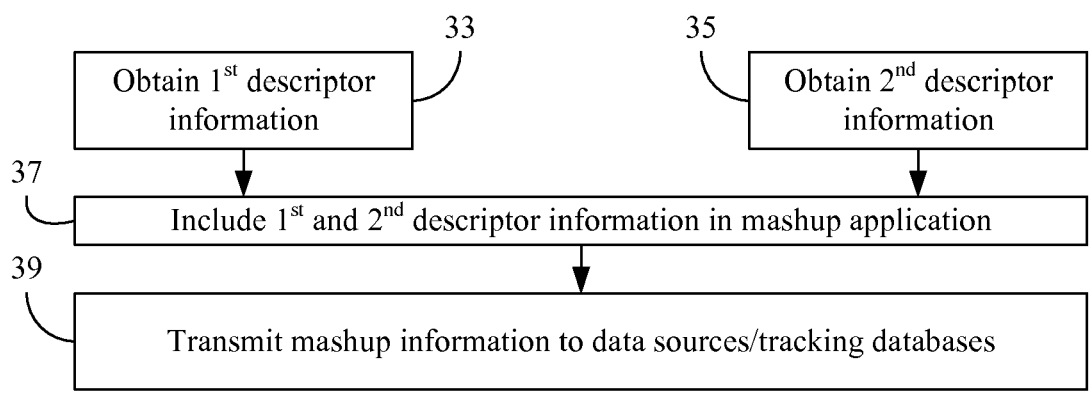
FIG. 2 is a flowchart of an example of a method of creating a mashup application according to an embodiment of the present invention.

Turning now to FIG. 2, a method 31 of creating a mashup application is shown. The method 31 may be implemented in a mashup building tool such as the mashup building tool 12 (FIG. 1), already discussed. In the illustrated example, processing block 33 provides for obtaining first descriptor information corresponding to first data from a first data source, and block 35 provides for obtaining second descriptor information corresponding to second data from a second data source. The first and second descriptor information may be included in a mashup application at block 37. Illustrated block 39 provides for transmitting mashup information to the first data source, where the mashup information indicates the inclusion of the first descriptor information with the second descriptor information in the mashup application.

Turning now to FIG. 3, one example of a tracking database 40 is shown. The illustrated database 40 may be readily substituted for the database 28 (FIG. 1), already discussed. The tracking database 40 may contain entries for various types of data that could be used in the formulation of mashup applications. For example, the database 40 might include entries for internal feed data (e.g., "IF0001"), internal text data (e.g., "IT0001"), internal audio data (e.g., "IA0001"), internal video data ("IV0001") and so on, where "internal" may be used to indicate data that is local to the data source in question. The nomenclature used herein is for discussion purposes only, and may vary depending upon the circumstances. In the illustrated example, the internal feed data IF0001 was used by a mashup process to create a mashup "P07920" that has been used three times in the past month. The mashup usage frequency may be updated periodically by the mashup process. The update procedure could be initiated by the data source, the mashup process, or other initiation point. Other data that was also used in the illustrated mashup was external multimedia data "EM0203", which has an interaction level with internal feed data IF0001 of ten in the mashup, and external audio data "EA0087", which has an interaction level with internal feed data IF0001 of zero. Interaction levels might be expressed on a scale of zero to ten, with ten being the highest level of interaction.

By capturing the relationship between the internal feed data IF0001 and the external data EM0203 and EA0087, the illustrated database 40 enables new and potentially useful relevance between disparate and unstructured data to be ascertained. Such relevance can be weighted based on the level of interaction between the data in question, the mashup frequency usage information, and/or other factors. For example, data relationships that have a high level of interaction and are found in frequently used mashups could be assigned the greatest weight and/or priority for further analysis. In addition, the existence of a relationship between internal feed data IF0001 and internal audio data IA0002 may be identified because in the illustrated example, both have a relationship to external multimedia data EM0203. This approach may be extended to identify even higher order relationships (e.g., local data ⇔remote data ⇔local data ⇔remote data, etc.) between all types of data, both internal and external. The database 40 may also utilize other known structures such as relational database structures and/or linked lists to track, manage, control and organize the data represented therein.

FIG. 4 shows a method 30 of providing data to a mashup application in which processing block 32 provides for receiving a request from a mashup application. The method 30 might be implemented in local data source such as the local data source 16 (FIG. 1), already discussed. The mashup application, which could be a local application or a remote application, might be executing in a web browsing environment. The request could be for specific data or for a certain type of data, as appropriate. The request may also represent an acceptance of data being "pushed" from the data source to the mashup application. Illustrated block 34 provides for supplying first data to the mashup process in response to the request. As already noted, the supplied data could include a wide variety of content such as a feed, blog or Wiki text, audio, video, or multimedia content. Mashup information may be received from the mashup application at block 36, wherein the mashup information can indicate that the first data was included with second data from another data source in an execution of the mashup application. By identifying the second data to the source of the first data, the illustrated approach enables significantly more meaning to be attached to the provision of the first data to the mashup application. Illustrated block 38 provides for storing the mashup information. In one example, the mashup information is stored to a tracking database.

Figure 5:
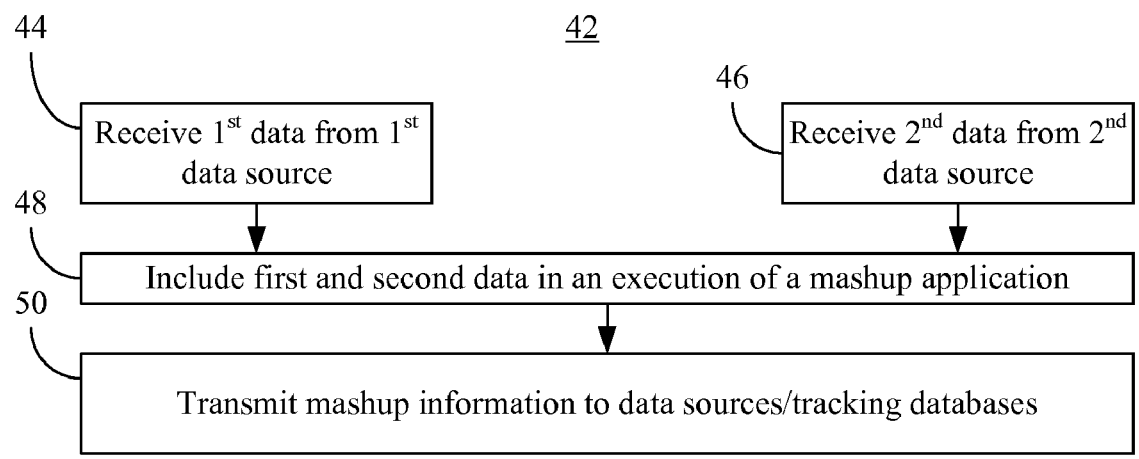
FIG. 5 is a flowchart of an example of a method of executing a mashup application according to an embodiment of the present invention.

FIG. 5 shows a method 42 of executing a mashup application. The method 42 may be implemented in executable code as a web browser 25 (FIG. 1), already discussed, or any other application or environment that may be used to execute mashup applications. In the illustrated example, block 44 provides for receiving first data from a first data source, and block 46 provides for receiving second data from a second data source. The number of data sources may be much greater depending upon the circumstances, and the description of two data sources is used merely to facilitate discussion. The first and second data may be included in the execution of a mashup application at block 48. Illustrated block 50 provides for transmitting mashup information to the data sources and/or tracking databases, where the mashup information identifies the data used in the mashup application. As already noted, the mashup information may also include an indication of the levels of interaction between the data used in the mashup, the usage frequency of the mashup, and various other characteristics of the mashup that may be useful to the data sources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer-implemented method comprising:
receiving a request transmission from a mashup application;
supplying first data to the mashup application in response to the request transmission;
receiving a mashup information transmission from the mashup application, the mashup information transmission being separate from the request transmission and indicating an inclusion of the first data with second data in an execution of the mashup application as a single, integrated application within a browser, wherein receiving the mashup information transmission includes receiving mashup usage frequency information and receiving an indication of a level of interaction between the first data and the second data in the mashup application;
weighting the mashup information based on at least one of the level of interaction and the mashup usage frequency information; and
storing the mashup information, wherein the mashup usage frequency tracks how many times the mashup application has been executed, and the level of interaction between the first data and the second data indicates a degree to which the first data leads to activity with regard to the second data.

2. The method of claim 1, wherein storing the mashup information includes storing the mashup information as an entry to a tracking database.

3. The method of claim 2, further including identifying a relationship between the first data and third data based on the entry.

4. The method of claim 3, wherein the third data includes data from a local data source.

5. The method of claim 3, wherein the third data includes data from a remote data source.

6. The method of claim 1, wherein the second data includes data from a remote source.

7. The method of claim 1, wherein the first data includes at least one of a feed, text, audio, video and multimedia content.

8. A computer program product comprising:
a computer readable medium; and
computer usable code stored on the computer readable medium, where, if executed by a processor, the computer usable code causes a computer to:
receive a request transmission from a mashup application;
supply first data to the mashup application in response to the request transmission;
receive a mashup information transmission from the mashup application, the mashup information transmission to be separate from the request transmission and indicate an inclusion of the first data with second data in an execution of the mashup application as a single, integrated application within a browser, wherein the mashup information transmission includes mashup usage frequency information and an indication of a level of interaction between the first data and the second data in the mashup application;
weight the mashup information based on at least one of the level of interaction and the mashup usage frequency information; and
store the mashup information, wherein the mashup usage frequency tracks how many times the mashup application has been executed, and the level of interaction between the first data and the second data indicates a degree to which the first data leads to activity with regard to the second data.

9. The computer program product of claim 8, wherein the computer usable code, if executed, causes a computer to store the mashup information as an entry to a tracking database.

10. The computer program product of claim 9, wherein the computer usable code, if executed, further causes a computer to identify a relationship between the first data and third data based on the entry.

* * * * *